United States Patent

[11] 3,572,945

[72] Inventor Donald R. Thompson
Woodstock, N.Y.

[21] Appl. No. 762,517
[22] Filed Sept. 25, 1968
[45] Patented Mar. 30, 1971
[73] Assignee International Business Machines Corporation Armonk, N.Y.

[54] METHOD AND SCANNING APPARATUS FOR COLOR SEPARATION AND IDENTIFICATION
11 Claims, 4 Drawing Figs.

[52] U.S. Cl. .......... 356/178, 250/219, 250/226, 178/5.2, 178/6, 178/7.1, 209/111.6, 235/61.115, 340/143.5
[51] Int. Cl. .......... G01j 3/46, G01n 21/02, G01n 21/18
[50] Field of Search .......... 356/173—178; 250/219 (Id) (Idd), 226; 235/61.115; 340/143.5 (RR Digest); 178/5.2 (A), 6, 7.1; 209/111.5, 111.6

[56] References Cited

UNITED STATES PATENTS

| | | | |
|---|---|---|---|
| 3,181,987 | 5/1965 | Polevitsky | 178/5.2X |
| 3,247,815 | 4/1966 | Polevitsky | 178/5.2X |
| 3,247,816 | 4/1966 | Polevitsky | 178/5.2X |
| 3,012,666 | 12/1961 | Cox | 209/111.6 |
| 3,205,484 | 9/1965 | Schwertz | 250/219X |
| 3,351,744 | 9/1967 | Masterson | 250/219X |
| 3,363,108 | 1/1968 | Spurr et al. | 250/226 |
| 3,444,517 | 5/1969 | Rabinow | 340/146.3 |

OTHER REFERENCES

Barber, " 21 Ways to pick Data Off Moving Objects," CONTROL ENGINEERING, October 1963, pp 82— 83.

*Primary Examiner*—Ronald L. Wibert
*Assistant Examiner*—R. J. Webster
*Attorney*—Hanifin and Jancin

ABSTRACT: A method and system for scanning color information such as a cartographic map and detecting a possible number of $3^{n-1}$ colors. The color information is reduced to digital information which may be recorded in a storage device.

Patented March 30, 1971 3,572,945

INVENTOR
DONALD R. THOMPSON

BY J. Jancin Jr.
ATTORNEY

METHOD AND SCANNING APPARATUS FOR COLOR SEPARATION AND IDENTIFICATION

BACKGROUND OF THE INVENTION

The present invention relates to an optical drum scanning system. More particularly, it relates to an optical drum scanning system capable of detecting and separating many colors which appear on a document surface.

In the present state of the color separation art, color detection and separation may be achieved by various methods such as chemical, photographic, and optical/electronic. With regard to optical/electronic techniques of color separation, it has often been necessary to require a filtering element for each color that is to be detected. This restraint is found to be necessary because various colors will develop similar electrical signal characteristics at a detection station and as such are indiscernable. Therefore, present methods require an initial separation of colors on the basis of their individual reflected light frequency spectrum prior to electronic processing of the color information.

It is generally known that every color under illumination may reflect radiant energy in a broad spectrum from the ultraviolet, through the visible, and into the infrared region. Within this spectral range it is also known that every color reflects radiant light energy of a particular frequency pattern, and furthermore, filtering elements are known in the art which will allow passage of various frequencies and cause the reflection of other frequencies. By use of these particular filtering elements, present systems have been capable of separating colored information. Bands of light energy would be sensed by a photosensitive element such as a phototube which will produce an electrical signal level in response to the reception of light energy. Furthermore, since filtering elements are capable of discriminating light energy in a band of wavelength frequencies, it is found that in any one band there may appear a set of colors which are in effect indiscriminable. That is, two colors may present a similar energy condition to the phototube and accordingly, a signal level will be produced at the output of the phototube upon the detection of either color. This problem has caused present systems to place limitations on the number of colors that may be used in the system.

A further difficulty encountered in many present systems is that in order to be able to detect more than one color, it has often been necessary to make numerous passes at scanning the document. This multiple scanning technique is both time consuming and impractical in the amount of data which it generates. Every particular point on the document being scanned will generate data for every scan of the document so that if it is desired to be able to detect one out of nine colors, it will be necessary to make nine passes over the document and therefore create nine discrete information quantities to represent every point on the document.

Another difficulty encountered in present systems is problem of ambiguity in the detection of colors. Identification of a color at a line edge where the scan spot overlaps the background color or where lightly drawn lines are found to partly cover the background color creates uncertain results in present systems. Furthermore, present techniques have difficulty in discerning colors which give a similar reflective energy signal in a portion of the spectral range. For example, the colors deep pink and vermillion have a similar reflective energy signal in the visible portion of the spectral range.

It is therefore a primary object of the present invention to provide an improved color separation scanning system.

Another object of the present invention is to detect and identify colors by a single scan.

Another object of the present invention is to provide a method of reducing color information into a digital format.

Another object of the present invention is to separate and detect numerous colors using only one filter element.

Another object of the present invention is to represent colors that are scanned by a representative data code.

A further object of the present invention is to reduce colors that are scanned into a data code that is compatible with digital computer systems.

A further object of the present invention is to reduce cartographic material into binary data.

Another object of the present invention is to eliminate ambiguity in the detection of different colors.

A further object of the present invention is to utilize all of the light energy collected from the document being scanned.

The foregoing and other objects, features, and advantages of the invention will be apparent from the following and more particular description of a preferred embodiment of the invention, as illustrated in the accompanying drawings in which.

Figure 1:
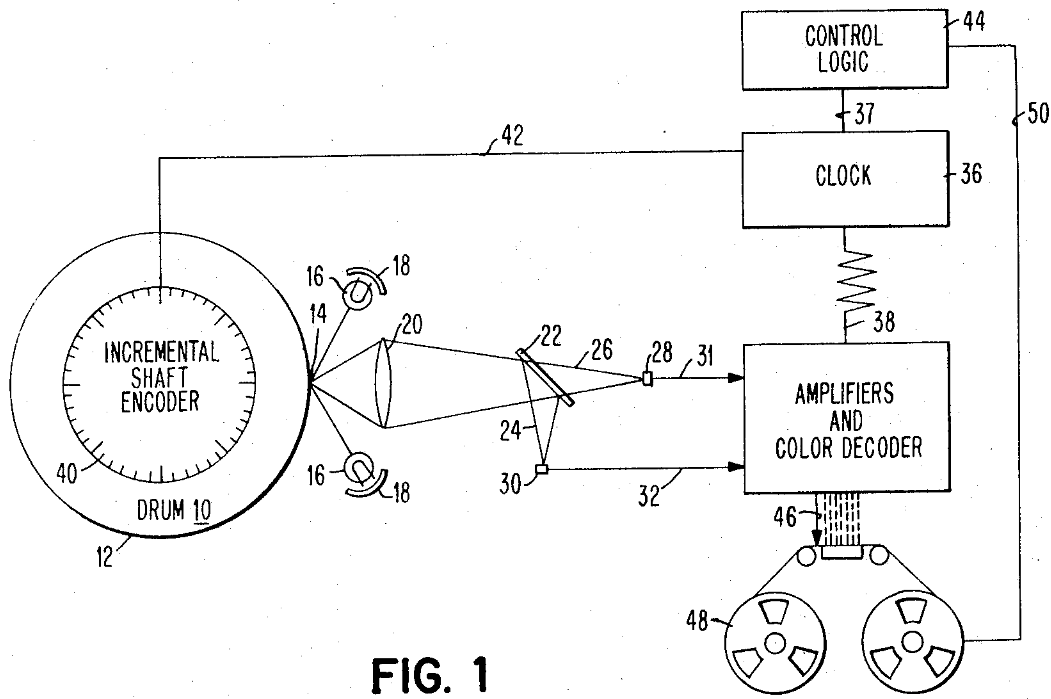
FIG. 1 is a diagrammatic representation of the color separation scanning system.

Briefly, the disclosed embodiment is capable of scanning color information such as a cartographic map and detecting a possible number of $3^{n11}$ colors. The variable $n$ represents the number of spectral paths to which the reflected light energy is sent by the beam splitting dichroic mirrors. The principle upon which the embodied system relies is based on a combination of relative radiant reflectance, relative spectral composition of the energy reflected from the document, and the fact that particular backing material used reflects as a neutral color which is uniform across the frequency bandwidth utilized and is of an intermediate level between black and white. Specifically, that neutral color is represented by a zero signal level, while a white pencil mark drawn on this backing material will reflect more energy than this neutral color and is represented by a positive signal and a black line drawn on the same material will reflect less light and therefore be represented by a negative signal.

The light energy reflected from the document is divided into two spectral regions by using a dichroic mirror. Each of these spectral regions or channels contains a reflected light energy level which may be greater than, equal to, or less than the reflectivity level of the background material in both spectral regions. Thus, a positive, zero, or minus signal is generated by each photosensor, depending on the amount of reflected light energy transmitted to it. This type of coding representation provides for three possible conditions on each channel. Therefore, by using probability theory it is seen that the total number of possible color combinations is $3^n$ where $n$ represents the number of channels which are being used. Since one of these combinations is the same as the background material, the total actual detectable colors is $3^n—1$. The disclosed embodiment utilizes a two channel system and is therefore capable of detecting $3^2—1$ or eight different colors.

The signal combinations which represent the nine colors utilized in the disclosed embodiment are shown in the following table.

| Color | Channel A | Channel B |
|---|---|---|
| #1 | Positive | Positive. |
| #2 | do | Zero. |
| #3 | do | Negative. |
| #4 | Zero | Positive. |
| Background or nondetectable color | do | Zero. |
| #5 | do | Negative. |
| #6 | Negative | Positive. |
| #7 | do | Zero. |
| #8 | do | Negative. |

Even though the color identification principle relies heavily on the lightness/darkness properties of many of the colors, identification is nonambiguous even at line edges where the scan spot overlaps the background or where lightly drawn lines are found where pigments only partly cover the background. If the instantaneous scan area contains too little reflective pigments to reach its digitizing or clip level, it simply will not be detected. Therefore, there is minimum possibility of confusion among varying lightness, same-hue colors. It is the neutral property of the background material that provides this characteristic.

In the disclosed embodiment separation and identification of different colors is achieved by dividing the reflected light energy in two channels of different spectral frequency. The reflected light energy is transmitted through and reflected from a dichroic mirror which divides the light into two separate channels. A detector and digitizing circuit associated with a respective channel converts the light energy in each channel into a positive, negative, or zero signal. The signals which are generated by the digitizing circuit are then decoded into binary numbers that represent the color appearing at the scan spot.

DETAILED DESCRIPTION OF THE INVENTION

The invention will now be described with reference to the accompanying drawings wherein a disclosed embodiment of the invention is set forth. The FIG. 1 is a block diagram representation of the color separation scanning system. In FIG. 1 there is shown holding means in the form of a drum 10 upon which a document 12 which is to be scanned is placed. The drum 10 is made to rotate by a conventional drum drive not shown, so that all points within the document are made to come under position 14. At position 14 light energy which is emanating from light source means 16 and reflectors 18 are directed onto the document 12 causing the reflected light energy from the document 12 to be directed through lens 20. Focusing lens 20 is interposed between the document 12 and dichroic mirror 22 and performs the function of directing the reflected light energy into a beam onto receiving means for separating the reflected light energy. The receiving means is represented by dichroic mirror 22. The mirror 22 is positioned to receive the reflected light energy and acts as a filtering element which separates the light energy beam into two complements of different spectral frequencies. These complements 24 and 26 are referred to as channel A and channel B. The complements are then introduced to photoresponsive means shown as sensors 28 and 30. Channel A provides light energy in one spectral range and is applied to sensor 28 and accordingly channel B provides light energy to be applied to sensor 30. Both sensors 28 and 30 which are positioned to detect signal information from channel A and channel B accordingly, transmit this signal energy level along lines 31 and 32 which are connected to and provide inputs to amplifier and color decoder 34. Decoder means which is represented by element 34 is connected to clock 36 via line 38. Clock 36 provides timing pulses along line 38 which pluses are in accordance with a particular position 14 which is encoded by means of encoder 40. Incremental shaft encoder 40 which is connected to drum 10 is of conventional design, a transparent disc with markings that modulate a light beam so that a pulse is generated for every modulation. Encoder means which is represented by element 40 operates in conjunction with drum 10 to provide a signal representative of position 14 on line 42 connected to clock 36. Timing means represented by clock 36 provide gating pulses along line 38 to the decoder 34 which decodes the information which is inputted along lines 31 and 32. Decoder 34 generates an output signal along lines 46 which output signal is representative of the color that was detected at position 14. Lines 46 carry a digital input signal from decoder 34 into a storage unit such as magnetic tape unit 48. Control logic 44 receives a clock signal from clock 36 via line 37 and serves the purpose of providing proper addressing and control signals along line 50 to the storage unit 48. The control signals cause the storage unit to advance as each byte of data is stored. This in effect provides for a continuous storage of data as different positions are scanned. During the scanning process the drum rotates and the lens system is moved laterally across the drum so that eventually the entire cartographic material on the drum will be digitized and placed on the storage unit.

Figure 2:
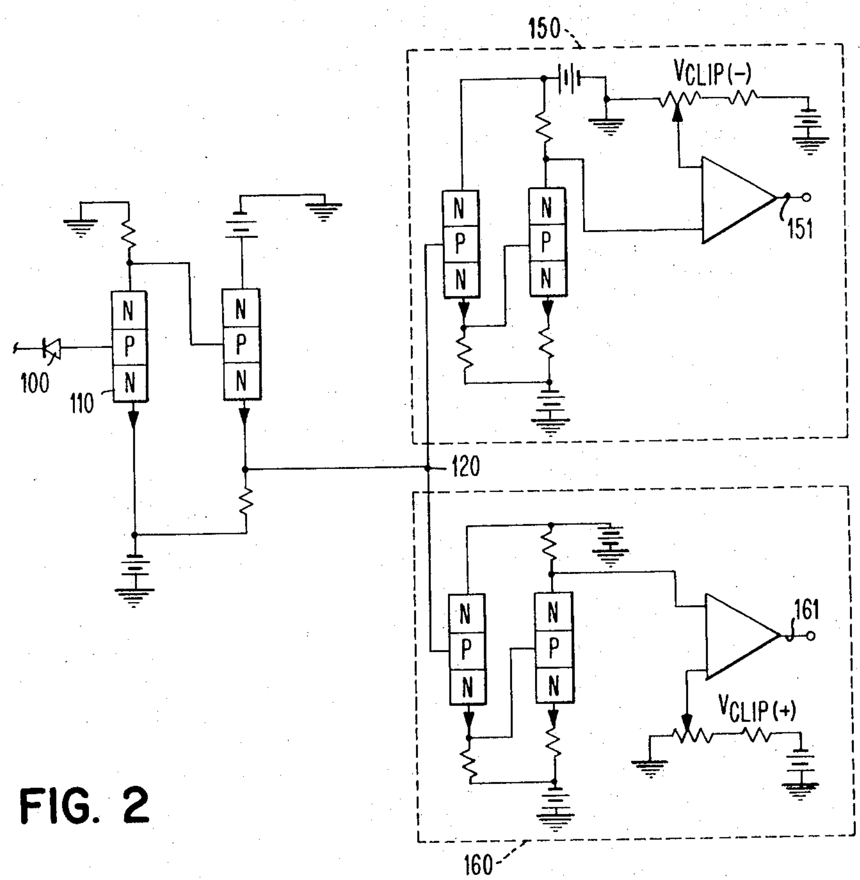
FIG. 2 is a schematic representation of the amplifier-digitizer circuit that converts the light reflectivity level to a representative electrical signal level.

Referring now to FIG. 2, there is shown a schematic diagram of digitizing means and more specifically, the photodiode sensor and amplifier-digitizer circuit which provides the digitized signals that are to be decoded. The light energy emanating from the dichroic mirror 22 is introduced into photodiode 100. The diode 100 has the effect of converting the light signal energy into an electrical pulse which is then amplified by transistor 110. The pulse signal is shown at point 120 as being a positive and negative signal level. This electrical signal is then introduced into the clipping circuits 150 and 160 which shape the electrical pulse into a more perfect digitized signal by clipping the front and trailing edges of the electrical pulse. Clipping circuit 150 will create a negative output at line 151 whenever the input at 120 exceeds the *V* clip voltage in negative amplitude. In a similar manner, clipping circuit 160 acts on positive signals at input 120 and creates the appropriate digitized signal at output 161.

Figure 3:
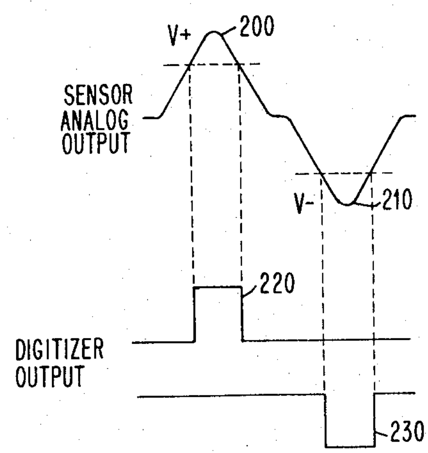
FIG. 3 is an illustration of a typical signal level that is digitized.

Referring now to FIG. 3, there is shown a more detailed graphic representation of the signal clipping of the sensor analogue output signal. As is shown, the signal level 200 appears at the sensor output as a result of a detection of high reflectance or positive light energy. Also shown is an analogue output signal 210 representing low reflectance or negative light energy. The digitized output of the positive analogue is represented by an approximately square wave signal 220 while the negative signal 230 represents the digitized amplifier output from a negative input.

Figure 4:
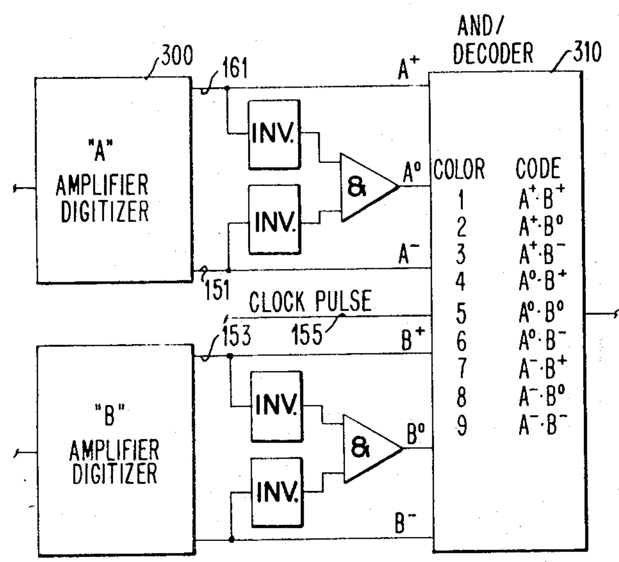
FIG. 4 illustrates a schematic representation of the decoder which detects signals on two channels.

Referring now to FIG. 4, there is shown the decoder circuit for detecting eight colors. The decoder required to decode, for example a three-channel or 27-color system, would consist of a simple extension of the circuits as shown in this FIG. The amplifier digitizer 300 is representative of the schematic shown in FIG. 2. The output from the digitizer 300 appearing at lines 151 and 161 for one channel and at lines 153 and 154 for the second channel provide inputs for two inverters and an AND circuit (for a not+, not− or a zero signal) and an AND circuit decoder 310 which develops a signal level which is outputted to the storage device whenever a sample pulse appears on line 155 to trigger the AND circuit decoder 310.

OPERATION OF THE INVENTION

In the operation of the system, color information such as a map or other document having various colors on a specific matte material which is selected for this system is to be placed on the drum 10 which rotates so as to allow continuous scanning of the document by the lens system. By providing that a complete pass be made in the rotational direction before movement of the lens system in a lateral direction, all possible points on the document material are scanned in succession and are outputted as digital information onto the storage device.

For example, consider that the first spot to be scanned contains the color 06. The incandescent lamps 16 and reflectors 18 direct light onto the color 06 appearing on the document surface so as to provide a reflected light energy emanating from the spot scan. This reflected energy is then transmitted through lens 20 onto dichroic mirror 22. The mirror 22 filters the light into two light channels of different spectral regions, such as red in channel A and blue in channel B. The light energy appearing in channels A and B is then transmitted to photosensors 28 and 30.

The reflective light energy in channels A and B are respectively less than and greater than the reflective light energy of the gray matte material. Therefore, channel A will have a negative signal and channel B will have a positive signal as shown in the table above. These negative and positive signals are then transformed into electrical signals of corresponding value by the digitizing circuit shown in FIG. 3. The electrical signal levels are then transmitted along lines 31 and 32 into decoder 34. The decoder 34 decodes the signal combination of negative and positive and generates an output byte that represents the color 06.

In synchronism with the transformation of the light energy into the electrical signals introduced into the decoder 34, the incremental shaft encoder 40 transmits pulses along line 39 into clock 36. Clock 36 in turn transmits timing pulses along line 38 into decoder 34. These timing pulses provide the proper gating signals at the AND circuit decoder 310 so as to provide output signals from the decoder. The timing signals which were generated by clock 36 were also introduced into control logic 44 via line 37. Control 44 in response to the timing pulse transmits control signals to the magnetic tape unit 48 to allow the decoder to transmit byte of data that represents the color 06. This byte of data is stored on magnetic tape with a corresponding address.

Drum 10 continues to rotate to the next spot to be scanned and a similar process as is carried out for this spot scan. This process is continued for all spots that exist in one rotational direction. After all of the spots in one complete rotation have been digitized and placed on the magnetic tape unit 48 the lens system is advanced in the lateral direction and the procedure is repeated for all spots in this second rotational position. By this manner of advancing the lens system, all spots appearing on the document surface are digitized and placed on the magnetic tape unit 48.

The disclosed embodiment shows a color separation scanning system which utilizes only one dichroic mirror and separates the light energy into two channels. This choice is not considered to be limiting since it would be obvious to those skilled in the art to provide for supplementary dichroic mirrors so as to have more than two channels and therefore, have a greater number of possible channel signal permutations so as to expand the number of possible colors that can be detected. Some possible choices of spectrum channel splitting which are capable of being used in a single mirror system are: infrared/visible or red/blue and in a two mirror system infrared/red/blue or red/green/blue. Similar to the single mirror-two channel disclosed embodiment discussed above, in a two mirror-three channel system a high reflectance color would present a positive signal level on each of the three channels and a low reflectance color would present a negative signal level on every channel. The remainder of the 27 possible code combinations for a three-channel system would consist of all permutations of the three signal levels in three channels.

The storage unit disclosed in the preferred embodiment is shown to be magnetic tape unit such as an IBM 729–IV. However, it would be obvious to those skilled in the art to substitute a storage disc, storage drum unit or any other data processing store device which satisfies the requirements of the system.

While the disclosed embodiment relates specifically to a scanning system, it may be recognized by those skilled in the art that the system may be readily modified to perform recording of information as well as scanning.

A recording system based on the principles disclosed would translate color coded information into a representation of its original pictorial form. Recording would involve the transfer of digital image data from tape storage to variations in light intensity on film. The digital values representing the image density would be transferred to the decoder where a straight analogue decoding could be performed. The output of the decoder would be an analogue signal representing the digital value of the input.

In conclusion, it is seen that the color separation scanner provides for the conversion of color information to digital form which may be stored for later data processing. The particular coding method used by this system relies on the use of a gray matte material which provides a reflectivity which is intermediate between high color reflectivity and low color reflectivity. By utilizing an intermediate baseline signal of zero it is possible to avoid ambiguities due to varying densities of pigments from lightly or heavily drawn lines.

Furthermore, the identification of a color is inherently nonambiguous even at line edges where the scan spot overlaps the background and the colored area. If the instantaneous scan area contains insufficient reflective pigment to reach its digitizing or clip level, it simply will not be detected and accordingly will not be confused with other colors.

While the invention has been particularly shown and described with reference to preferred embodiments thereof, it will be understood by those skilled in the art that various changes in form and detail may be made therein without departing from the spirit and scope of the invention.

I claim:

1. In a system for detecting and separating different colors from among a set of colors and for reducing the detected colors into digital information, the color separation being done on the basis of the spectral reflectivity pattern of the individual colors which appear on the surface of a document to be scanned, the document to be scanned having a background color which is in the set of colors, and which reflects as a neutral color which is uniform across the frequency bandwidth utilized and is of an intermediate level between black and white, the combination comprising:

holding means for supporting a document that presents a scanning surface;

light source means for providing light energy to be reflected from said surface;

receiving means for separating the reflected light energy emanating from the surface of the document into two light energy channels of different spectral regions such that the background color reflects as a neutral color in each of said spectral regions i.e., uniform across each spectral region and intermediate between black and white;

two photoresponsive means, each being in the light path within a different one of the light energy channels for detecting the amount of light energy present in the channel and for providing an electrical signal which is a function of the amount of light energy in the channel, the electrical signal being referred to as a background signal when the amount of light energy present in the channel is the amount of light energy which is present in the channel when the color reflecting the light is a background color, the electrical signal being referred to as a high energy signal when the amount of light energy in the channel is greater than the amount of light energy present when the color reflecting the light is a background color, and the electrical signal being referred to as a low energy signal when the amount of light energy in the channel is less than the amount of light energy present when the color reflecting the light is a background;

digitizing means generating a zero output signal in response to a background signal from the photoresponsive means, generating a positive signal in response to a high energy signal from the photoresponsive means and generating a negative signal in response to a low energy signal from the photoresponsive means;

decoder means for receiving said output signal to determine the spectral reflectivity pattern of the color present on the scanning surface and to provide a further output signal which indicates the spectral reflectivity pattern of the scanned portion of the surface;

encoder means responsive to the position on the document surface from which light energy from the light source means is being reflected, for providing position signals; and timing means connected to the encoder means for receiving said position signals from said encoder means, said timing means generating timing signals from the position signals and an output of said timing means being connected to the decoder means so that the timing signals determine when the decoder means receives and decodes the electrical output signals generated by the digitizing means for the two light energy channels.

2. The apparatus of claim 1 wherein the background color is substantially achromatic.

3. In a system for detecting and separating different colors from among a set of colors which appear on the surface of a document to be scanned and for reducing the colors into digital information, the color separation being done on the basis of the spectral reflectivity pattern of the individual colors which appear on the surface of the document to be scanned, the document having a background color which is in the set of colors and which reflects as a neutral color which is uniform across the frequency bandwidth utilized and is of an intermediate level between black and white, the combination comprising:

holding means for supporting a document that presents a scanning surface;

light source means for providing light energy to be reflected from said surface;

receiving means for separating the reflected light energy emanating from the surface of said document into light energy channels of different spectral regions such that the background color reflects as a neutral color, in each of said spectral regions i.e., uniform across each spectral region and intermediate between black and white;

two photoresponsive means, each being in a light path within a different one of the light energy channels for detecting the amount of light energy present in the channel and for providing an electrical signal which is a function of the amount of light energy in the channel, the electrical signal being referred to as a background signal when the amount of light energy present in the channel is the amount of light energy which is present in the channel when the color reflecting the light is a background color, the electrical signal being referred to as a high energy signal when the amount of light energy in the channel is greater than the amount of light energy present in the channel when the color reflecting the light is a background color, and the electrical signal being referred to as a low energy signal when the amount of light energy in the channel is less than the amount of light energy present in the channel when the color reflecting the light is a background color;

digitizing means generating a zero output signal in response to a background signal from the photoresponsive means, generating a positive signal in response to a high energy signal from the photoresponsive means and generating a negative signal in response to a low energy signal from the photoresponsive means;

decoder means for receiving said output signals to determine the spectral reflectivity pattern of the color present on the scanning surface and to provide a further output signal which indicates the spectral reflectivity pattern of the scanned portion of the surface;

encoder means connected to the holding means for providing position signals responsive to the position on the document surface from which light energy from the light source means is being reflected;

timing means connected to the encoder means for receiving said position signals from said encoder means, said timing means generating timing signals from the position signals and an output of said timing means being connected to the decoder means so that the timing signals determine when the decoder means receives and decodes the electrical output signals generated by the digitizing means for the two light energy channels;

storage means for storing said further output signals; and control means connected between said encoder means and said decoder means for selectively gating said further output signals to said storage means.

4. The apparatus of claim 3 wherein the background color is substantially achromatic.

5. A method of separating and detecting different colors present on a background surface having a background color which reflects as a neutral color which is uniform across the frequency bandwidth utilized and is of an intermediate level between black and white, comprising the steps of:

applying light energy to the surface upon which the different colors appear;

dividing the reflected light energy emanating from said surface into two channels of light energy of different spectral regions such that the background color reflects as a neutral color, in each of said spectral regions i.e., uniform across each spectral region and intermediate between black and white;

sensing the amount of reflected light energy that appears in each channel;

transforming the amount of light energy sensed in each channel into a positive electrical signal when high energy is sensed, into a negative electrical signal when low light energy is sensed and into a zero electrical signal when an intermediate light energy level is sensed, an intermediate light energy level being present in each channel when the light energy is being reflected by the background color; and analyzing the signals levels on the channels and determining the spectral reflectivity pattern of the color which is reflecting the light energy.

6. The method of claim 5 wherein the background color is substantially achromatic.

7. The method of claim 5 wherein said spectral regions are nonoverlapping and comprise substantially the entire visible spectrum.

8. The system of claim 3 wherein said receiving means is a dichroic mirror.

9. The system of claim 1 further comprising storage means for storing said further output signal.

10. The system as defined in claim 2 further comprising control means connected between said encoder means and said decoder means for selectively gating said further output signal to said storage means.

11. The system of claim 1 wherein said receiving means is a dichroic mirror.